US009483377B2

United States Patent
Ratay et al.

(10) Patent No.: US 9,483,377 B2
(45) Date of Patent: Nov. 1, 2016

(54) APPARATUS AND METHOD FOR ENABLING A USER TO MONITOR SKEW OF RESOURCE USAGE ACROSS DIFFERENT COMPONENTS OF A LARGE DATABASE SYSTEM

(71) Applicant: TERADATA US, INC., Dayton, OH (US)

(72) Inventors: Steven Michael Ratay, Lake Forest, IL (US); Eric Scheie, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 203 days.

(21) Appl. No.: 14/244,946

(22) Filed: Apr. 4, 2014

(65) Prior Publication Data

US 2015/0186243 A1 Jul. 2, 2015

Related U.S. Application Data

(60) Provisional application No. 61/922,538, filed on Dec. 31, 2013.

(51) Int. Cl.
*G06F 17/30* (2006.01)
*G06F 11/34* (2006.01)
*G06F 11/32* (2006.01)

(52) U.S. Cl.
CPC ......... *G06F 11/3452* (2013.01); *G06F 11/323* (2013.01); *G06F 11/3419* (2013.01); *G06F 11/3433* (2013.01); *G06F 17/30339* (2013.01); *G06F 2201/80* (2013.01); *G06F 2201/81* (2013.01)

(58) Field of Classification Search
CPC .................................................. G06F 17/30
See application file for complete search history.

(56) References Cited

U.S. PATENT DOCUMENTS

| 7,533,313 | B1* | 5/2009 | Retersdorf | G01R 31/2894 702/1 |
| 8,676,621 | B1* | 3/2014 | Helfrich | G06Q 10/0631 705/37 |
| 2008/0091977 | A1* | 4/2008 | Miguelanez | G06F 11/273 714/37 |
| 2011/0225533 | A1* | 9/2011 | Kuno | G06F 17/30445 715/772 |
| 2013/0067381 | A1* | 3/2013 | Yalovsky | G06F 11/321 715/772 |
| 2014/0006330 | A1* | 1/2014 | Biem | G06F 11/0751 706/46 |

\* cited by examiner

*Primary Examiner* — Khanh Pham
(74) *Attorney, Agent, or Firm* — Michael Chan

(57) ABSTRACT

A method and apparatus are provided for facilitating performance monitoring of a large database system. The apparatus comprises a processor and a storage device communicatively coupled with the processor. The processor is programmed to (i) retrieve resource usage data points, (ii) calculate an outlier threshold value based upon values of data points, and (iii) determine if the value of each data point is outside of the threshold value. The processor is further programmed to (iv) plot the value of the data point in histogram with a first color when the data point value is determined to be outside of the threshold value, (v) plot the data point value in histogram with a second color when the data point value is determined to be not outside of the threshold value, and (vi) display the histogram containing plotted data point values of the first color and plotted data point values of the second color to enable a user to quickly and easily identify a potential skew condition.

5 Claims, 9 Drawing Sheets

SKEW QUANTIFICATION AND HISTOGRAM PLOTTING ROUTINE

APPARATUS AND METHOD FOR ENABLING A USER TO MONITOR SKEW OF RESOURCE USAGE ACROSS DIFFERENT COMPONENTS OF A LARGE DATABASE SYSTEM

CROSS REFERENCE TO RELATED APPLICATIONS

This application claims priority under 35 U.S.C. §119(e) to the following co-pending and commonly-assigned patent application, which is incorporated herein by reference:

Provisional Patent Application Ser. No. 61/922,538, entitled "APPARATUS AND METHOD FOR ENABLING A USER TO MONITOR SKEW OF RESOURCE USAGE ACROSS DIFFERENT COMPONENTS OF A LARGE DATABASE SYSTEM," filed on Dec. 31, 2013, by Steve Ratay and Eric Scheie.

TECHNICAL FIELD

The present disclosure relates to large database systems, and is particularly directed to an apparatus and method for enabling a user to monitor skew of resource usage across different components of a large database system.

BACKGROUND

Modern database systems execute a variety of query requests concurrently and operate in a dynamic environment of cooperative systems, each comprising of numerous hardware components subject to failure or degradation. The need to regulate concurrent hardware and software 'events' has led to the development of a field which may be generically termed 'Workload Management'.

Workload management techniques focus on managing or regulating a multitude of individual yet concurrent requests in a database system by effectively controlling resource usage within the database system. Resources may include any component of the database system, such as CPU (central processing unit) usage, hard disk or other storage means usage, or disk I/O (input/output) usage. Workload management techniques fall short of implementing a full system regulation, as they do not manage unforeseen impacts, such as unplanned situations (e.g., a request volume surge, the exhaustion of shared resources, or external conditions like component outages) or even planned situations (e.g., systems maintenance or data load).

A database of a database system is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One vital performance metric to monitor is skew of resource usage across the different parallel components of the database system. As a database becomes larger, the more impactful skew can be on the overall system. Database systems with tens or hundreds of nodes can start to lose significant portions of their overall processing capacity when work becomes skewed to a portion of the nodes in the system.

There are a number of different resources which can be monitored for effective parallel usage across the database system. These different resources include CPU usage, disk I/O usage, memory usage, and network usage, for examples. Monitoring of this data for a large database system may not immediately reveal any skew problem because such data is usually presented in ordered lists of raw data values.

All database systems have some amount of skew. A person monitoring a database system sometimes tries to evaluate how much skew is acceptable and how much skew is too much. This person though is unable to make such an evaluation by just simply looking at data contained in a list of raw data values. It would be desirable to enable a user to quickly and easily evaluate a potential skew condition (i.e., is the amount of skew acceptable or unacceptable) in a large parallel data processing system.

SUMMARY

Disclosed embodiments provide an apparatus and method for enabling a user to monitor skew of resource usage across different components of a large database system. The apparatus comprises a processor and a storage device communicatively coupled with the processor. The processor is programmed to (i) retrieve a set of resource usage data points, (ii) calculate a first outlier threshold value based upon values of data points from the set of resource usage data points, and (iii) determine if the value of each data point of the retrieved set of resource usage data points is outside of the calculated first outlier threshold value. The processor is further programmed to (iv) plot the value of the data point in histogram with a first color when the data point value is determined to be outside of the calculated first outlier threshold value, (v) plot the value of the data point in histogram with a second color which is different from the first color when the data point value is determined to be not outside of the calculated first outlier threshold value, and (vi) display the histogram containing plotted data point values of the first color and plotted data point values of the second color which is different from the first color to enable a user to quickly and easily identify a potential skew condition associated with the large database system.

BRIEF DESCRIPTION OF THE DRAWINGS

Aspects of the present disclosure are best understood from the following detailed description when read with the accompanying figures, in which.

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

Figure 1:
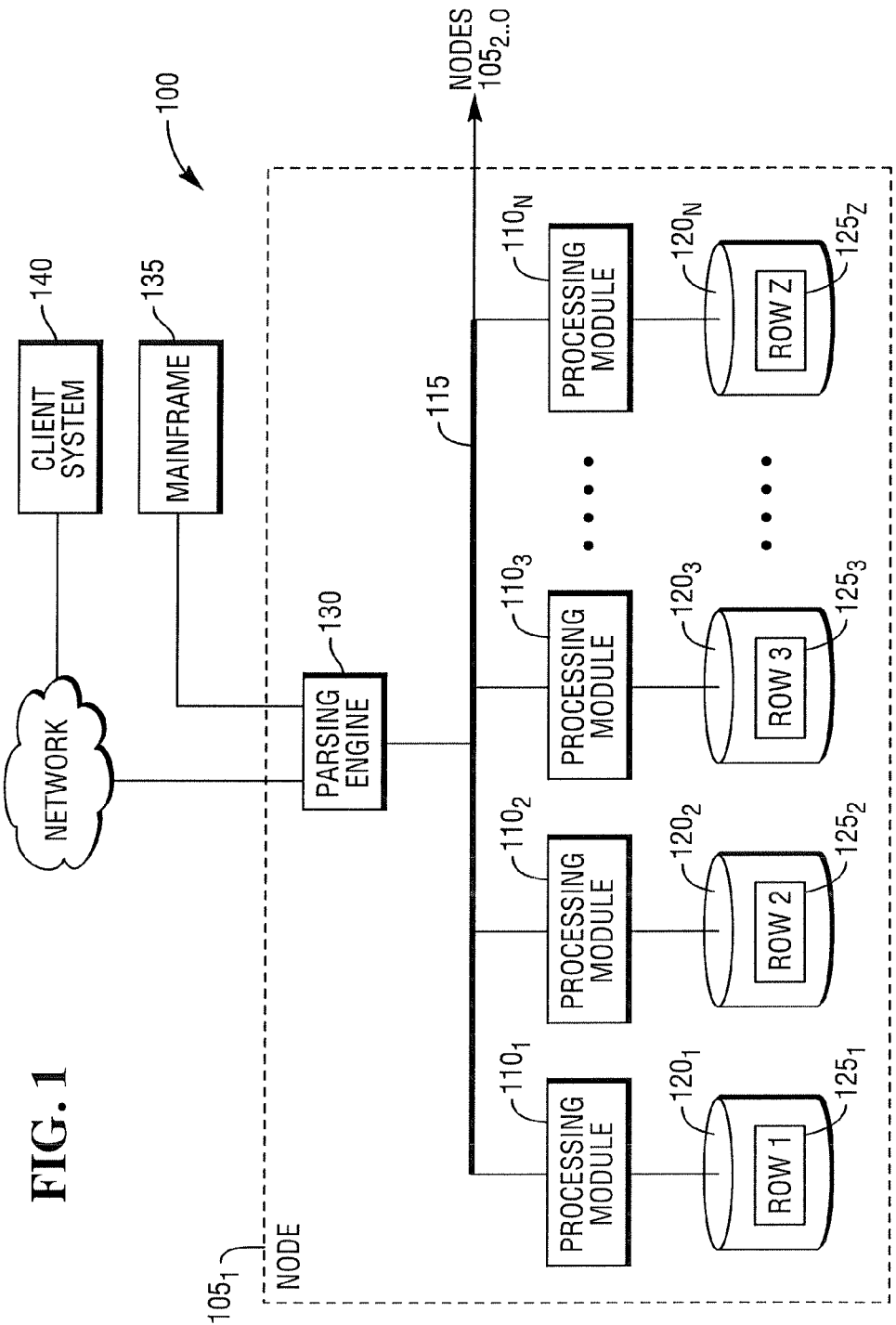
FIG. 1 depicts a diagrammatic representation of an exemplary architecture for a large database system that is suited to be monitored for skew of resource usage in accordance with disclosed embodiments.

FIG. 1 depicts a diagrammatic representation of an exemplary architecture for a large database system (DBS) 100, such as a Teradata Active Data Warehousing System, that is suited to be monitored for skew of resource usage in accordance with disclosed embodiments. The database system 100 includes a relational database management system (RDBMS) built upon a massively parallel processing (MPP) system. Other types of database systems, such as object-relational database management systems (ORDBMS) or those built on symmetric multi-processing (SMP) platforms, are also suited for use. The depicted and described architecture is exemplary only and is chosen to facilitate an understanding of the disclosed embodiments.

Many millions or billions of records may be managed by the database system 100. FIG. 1 shows a sample architecture for one node $105_1$ of the DBS 100. The DBS node $105_1$ includes one or more processing modules $110_{1 \ldots N}$, connected by a network 115 that manage the storage and retrieval of data in data storage facilities $120_{1 \ldots N}$. Each of the processing modules $110_{1 \ldots N}$ may be one or more physical processors or each may be a virtual processor, with one or more virtual processors running on one or more physical processors.

The system stores data in one or more tables in the data storage facilities $120_{1 \ldots N}$. The rows $125_{1 \ldots Z}$ of the tables are stored across multiple data storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data storage facilities $120_{1 \ldots N}$ in response to queries received from a user at a mainframe 135 or a client computer 140. The DBS 100 usually receives queries in a standard format, such as SQL.

Figure 2:
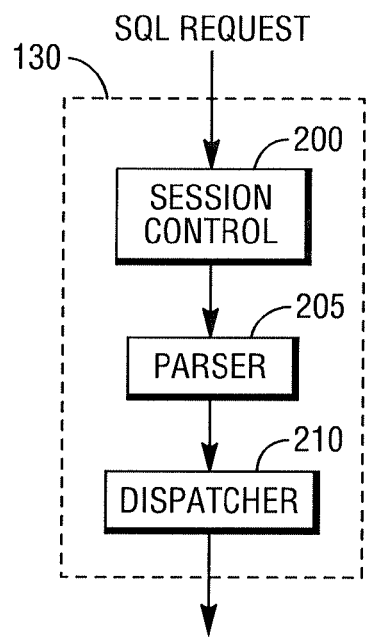
FIG. 2 is a diagrammatic representation of a parsing engine used in the large database system of FIG. 1.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
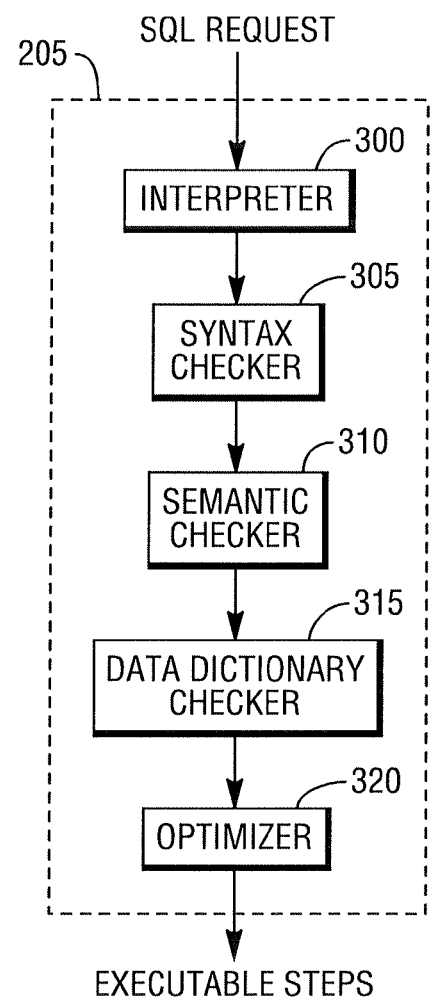
FIG. 3 is a diagrammatic representation of parser processing in FIG. 2.

Once the session control 200 allows a session to begin, a user may submit a SQL request that is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320) that develops the least expensive plan to perform the request.

The DBS described herein accepts performance goals for each workload as inputs, and dynamically adjusts its own performance, such as by allocating DBS resources and throttling back incoming work. In one example system, the performance parameters are called priority scheduler parameters. When the priority scheduler is adjusted, weights assigned to resource partitions and allocation groups are changed. Adjusting how these weights are assigned modifies the way access to the CPU, disk and memory is allocated among requests. Given performance objectives for each workload and the fact that the workloads may interfere with each other's performance through competition for shared resources, the DBS may find a performance setting that achieves one workload's goal but makes it difficult to achieve another workload's goal.

The performance goals for each workload will vary widely as well, and may or may not be related to their resource demands. For example, two workloads that execute the same application and DBS code could have differing performance goals simply because they were submitted from different departments in an organization. Conversely, even though two workloads have similar performance objectives, they may have very different resource demands.

The system includes a "closed-loop" workload management architecture capable of satisfying a set of workload-specific goals. In other words, the system is a goal-oriented workload management system capable of supporting complex workloads and capable of self-adjusting to various types of workloads. In Teradata, the workload management system is generally referred to as Teradata Active System Management (TASM).

The system's operation has four major phases: 1) assigning a set of incoming request characteristics to workload groups, assigning the workload groups to priority classes, and assigning goals (called Service Level Goals or SLGs) to the workload groups, 2) monitoring the execution of the workload groups against their goals, 3) regulating (adjusting and managing) the workload flow and priorities to achieve the SLGs, and 4) correlating the results of the workload and taking action to improve performance. The performance improvement can be accomplished in several ways: 1) through performance tuning recommendations such as the creation or change in index definitions or other supplements to table data, or to recollect statistics, or other performance tuning actions, 2) through capacity planning recommendations, for example increasing system power, 3) through utilization of results to enable optimizer self-learning, and 4) through recommending adjustments to SLGs of one workload to better complement the SLGs of another workload that it might be impacting. All recommendations can either be enacted automatically, or after "consultation" with the database administrator (DBA).

Figure 4:
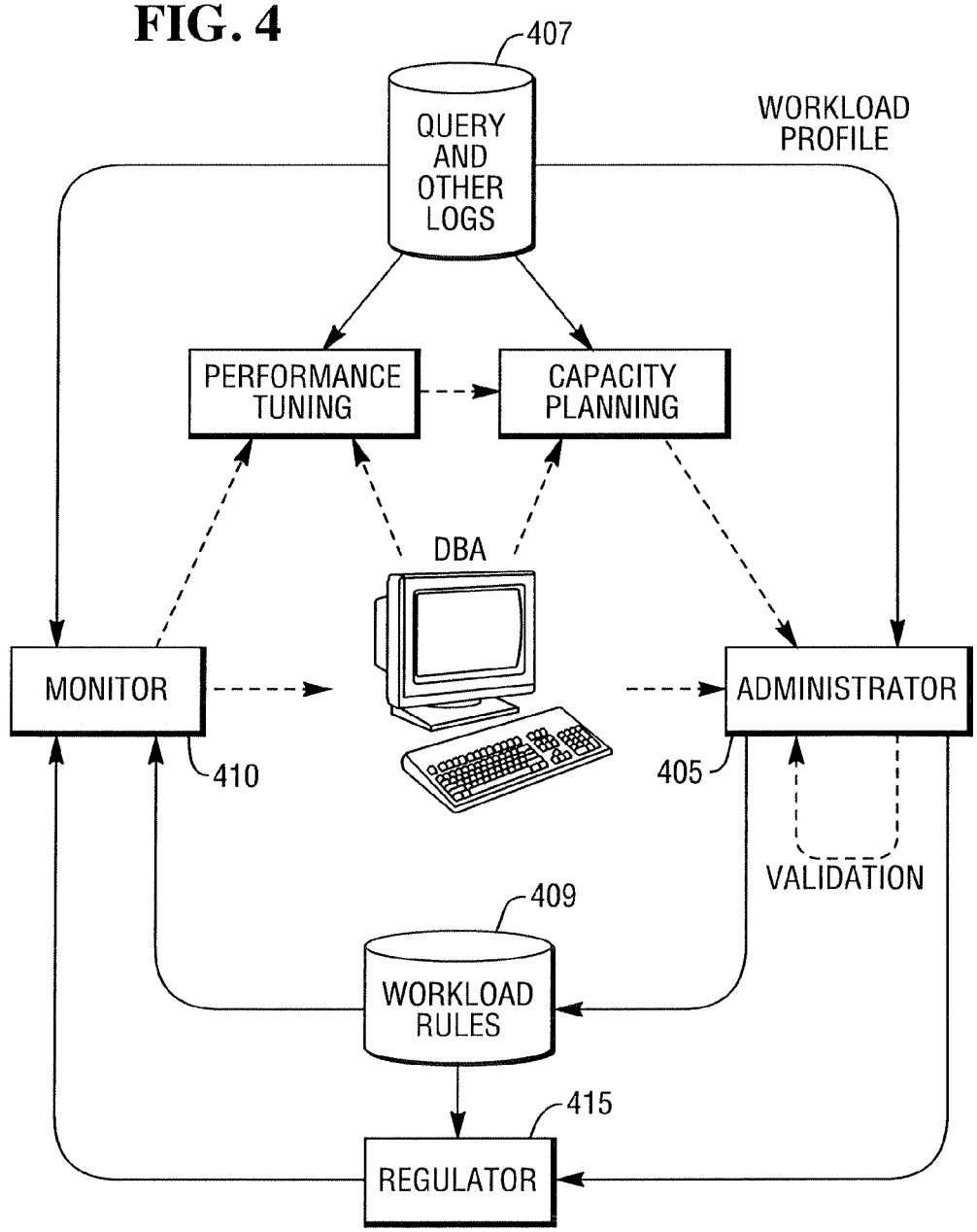
FIGS. 4 and 5 are block diagrams of a workload management system for administering workload of a database system.

The system includes the following components (illustrated in FIG. 4):

1) Administrator (block 405): This component provides a graphical user interface (GUI) to define workloads and their SLGs and other workload management requirements. The administrator 405 accesses data in logs 407 associated with the system, including a query log, and receives capacity planning and performance tuning inputs as discussed above. The administrator 405 is a primary interface for the DBA. The administrator also establishes workload rules 409, which are accessed and used by other elements of the system.

2) Monitor (block 410): This component provides a top level dashboard view, and the ability to drill down to various details of workload group performance, such as aggregate execution time, execution time by request, aggregate resource consumption, resource consumption by request, etc. Such data is stored in the query log and other logs 407 available to the monitor. The monitor also includes processes that initiate the performance improvement mechanisms listed above and processes that provide long term trend reporting, which may include providing performance improvement recommendations. Some of the monitor functionality may be performed by the regulator, which is described in the next paragraph.

3) Regulator (block 415): This component dynamically adjusts system settings and/or projects performance issues and either alerts the DBA or user to take action, for example, by communication through the monitor, which is capable of providing alerts, or through the exception log, providing a way for applications and their users to become aware of, and take action on, regulator actions. Alternatively, the regulator can automatically take action by deferring requests or executing requests with the appropriate priority to yield the best solution given requirements defined by the administrator (block 405).

The workload management administrator (block 405), or "administrator," is responsible for determining (i.e., recommending) the appropriate application settings based on SLGs. Such activities as setting weights, managing active work tasks and changes to any and all options will be automatic and taken out of the hands of the DBA. The user will be masked from all complexity involved in setting up the priority scheduler, and be freed to address the business issues around it.

Figure 5:
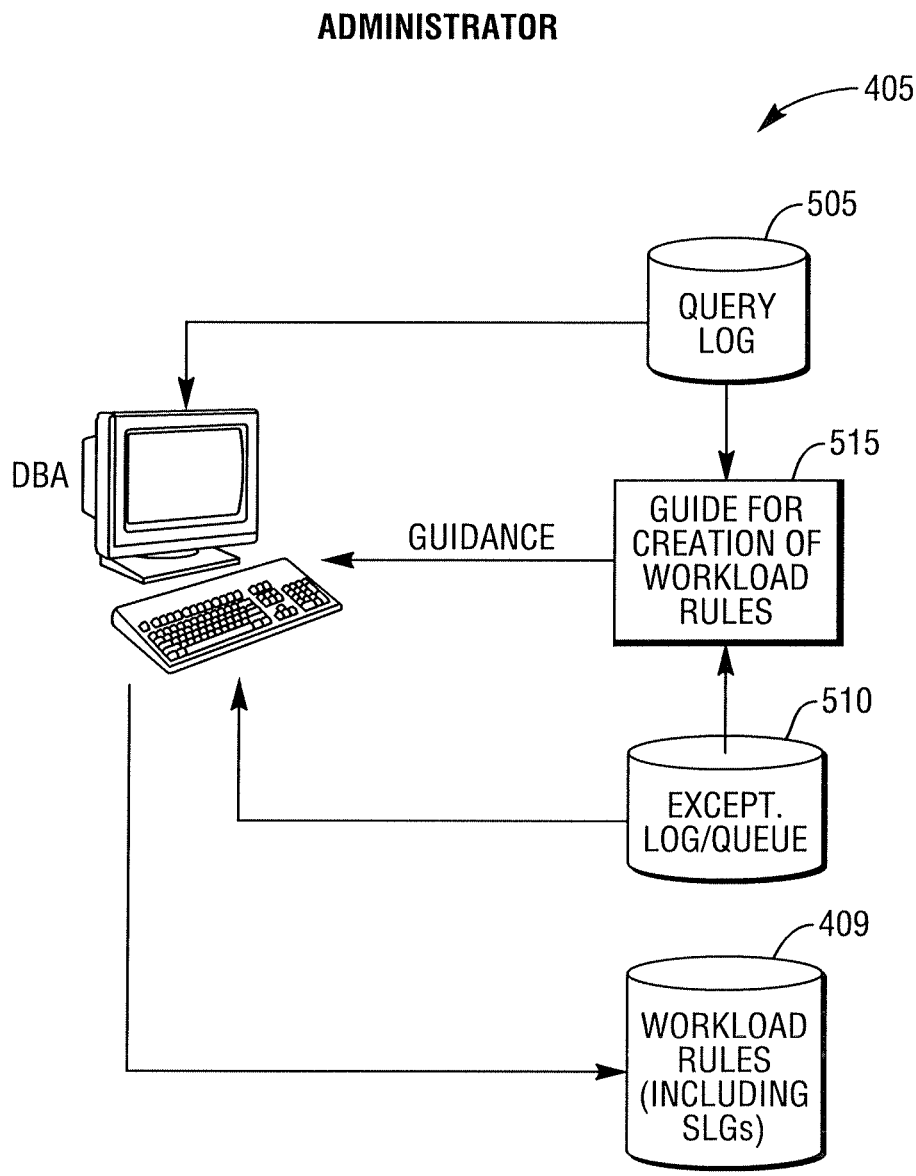

As shown in FIG. 5, the workload management administrator (block 405) allows the DBA to establish workload rules, including SLGs, which are stored in a storage facility 409, accessible to the other components of the system. The DBA has access to a query log 505, which stores the steps performed by the DBS in executing a request along with database statistics associated with the various steps, and an exception log/queue 510, which contains records of the system's deviations from the SLGs established by the administrator. With these resources, the DBA can examine past performance and establish SLGs that are reasonable in light of the available system resources. In addition, the system provides a guide for creation of workload rules 515 which guides the DBA in establishing the workload rules 409. The guide accesses the query log 505 and the exception log/queue 510 in providing its guidance to the DBA.

The administrator assists the DBA in:

a) Establishing rules for dividing requests into candidate workload groups, and creating workload group definitions. Requests with similar characteristics (users, application, table, resource requirement, etc.) are assigned to the same workload group. The system supports the possibility of having more than one workload group with similar system response requirements.

b) Refining the workload group definitions and defining SLGs for each workload group. The system provides guidance to the DBA for response time and/or arrival rate threshold setting by summarizing response time and arrival rate history per workload group definition versus resource utilization levels, which it extracts from the query log (from data stored by the regulator, as described below), allowing the DBA to know the current response time and arrival rate patterns. The DBA can then cross-compare those patterns to satisfaction levels or business requirements, if known, to derive an appropriate response time and arrival rate threshold setting, i.e., an appropriate SLG. After the administrator specifies the SLGs, the system automatically generates the appropriate resource allocation settings, as described below. These SLG requirements are distributed to the rest of the system as workload rules.

c) Optionally, establishing priority classes and assigning workload groups to the classes. Workload groups with similar performance requirements are assigned to the same class. d) Providing proactive feedback (i.e., Validation) to the DBA regarding the workload groups and their SLG assignments prior to execution to better assure that the current assignments can be met, i.e., that the SLG assignments as defined and potentially modified by the DBA represent realistic goals. The DBA has the option to refine workload group definitions and SLG assignments as a result of that feedback.

During operation of the database system, a user (such as the DBA) can monitor skew of resource usage across different parallel components of the system. The resource usage may comprise CPU usage, disk I/O usage, memory usage, or network usage. In accordance with disclosed embodiments, a skew quantification and histogram plotting routine is provided for enabling a user to monitor skew of resource usage across different components of a large database system.

Figure 6A:
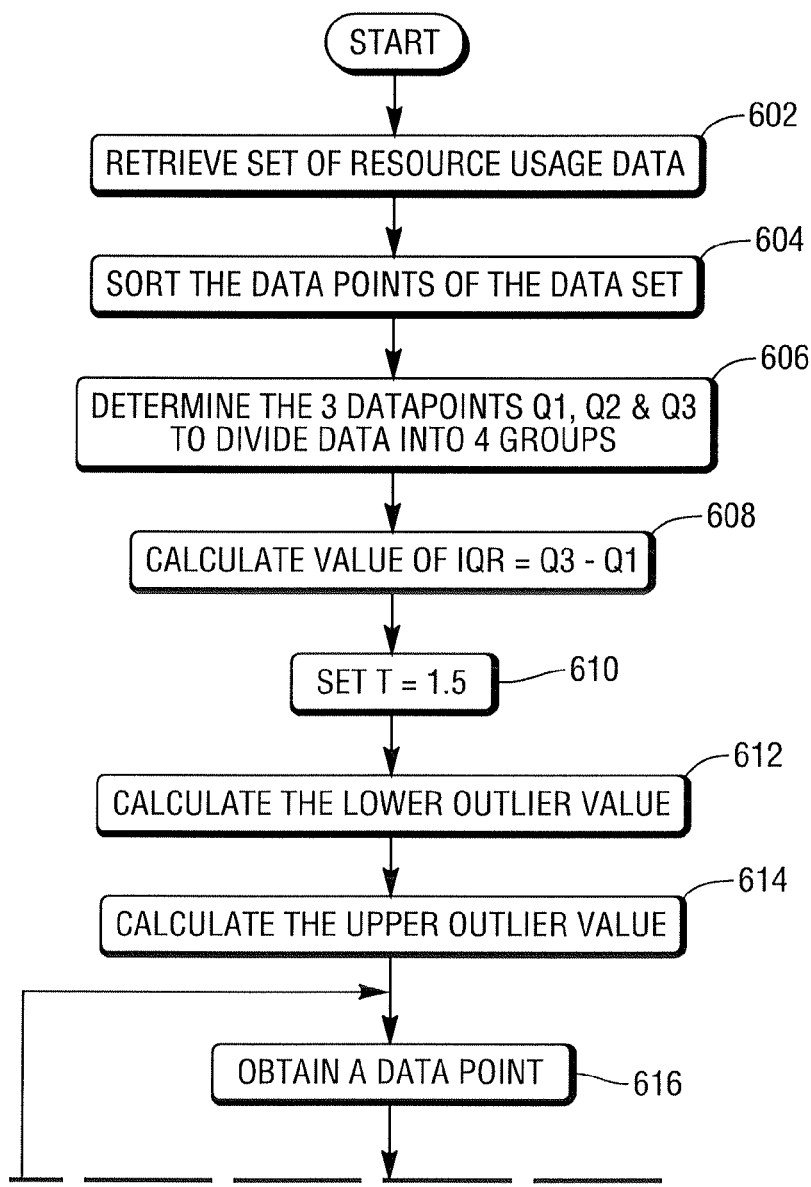
FIGS. 6A and 6B provide a flowchart that depicts processing of an example skew quantification and histogram plotting routine to facilitate performance monitoring of a database system in accordance with an embodiment.
Figure 6B:
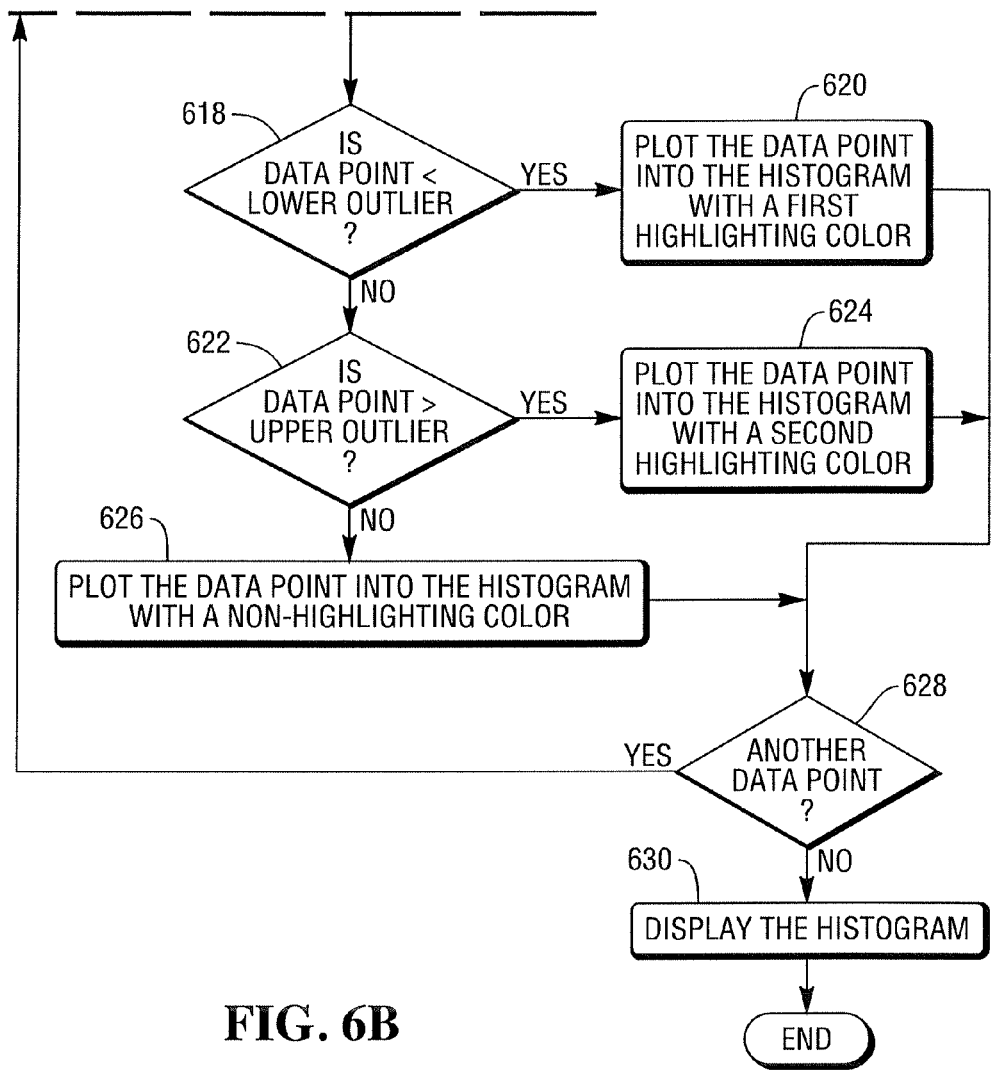

FIGS. 6A and 6B provide a flowchart 600 of an example skew quantification and histogram plotting routine implemented in accordance with disclosed embodiments. The processing steps of FIG. 6 may be implemented as computer-executable instructions tangibly embodied on a computer-readable medium executable by a processing system, such as one or more of the processing modules $110_1$-$110_N$ depicted in FIG. 1.

In step 602, a set of resource usage data (such as CPU usage data for example) is retrieved from memory. The retrieved set of resource usage data is sorted (step 604) and divided into four equal groups of data points. More specifically, the three data points of Q1, Q2, and Q3 are determined to divide the data points into the four equal groups (step 606). The Q2 data point is the median point which separates the two groups with the lowest CPU usage data points and the two groups with the highest CPU usage data points. The Q1 data point is the median point which separates the two groups with the lowest CPU usage data points. The Q3 data point is the median point which separates the two groups with the highest CPU usage data points.

After the Q1, Q2, and Q3 data points are determined in step 606, a value for the interquartile range (i.e., the IQR value) is calculated by subtracting the value of the Q1 data point from the value of the Q3 data point (step 608). Then a weighting factor "T" is set to a value of "1.5" (step 610). Both the IQR value the T-value are used to determine if each data point of the retrieved set of data points is an outlier or not as described hereinbelow.

A lower outlier value ("LOV") is calculated (step 612) by subtracting the product of the T-value and the IQR value from the Q1 value (i.e., LOV=Q1−T(IQR)). An upper outlier value ("UOV") is calculated (step 614) by adding the product of the T-value and the IQR value to the Q3 value (i.e., UOV=Q3+T(IQR)). After the LOV and the UOV are calculated, a data point from the set of retrieved data points is retrieved (step 616).

A determination is then made in step 618 as to whether the value of the data point from step 616 is less than the lower outlier value. If the determination in step 618 is affirmative (i.e., the value of the data point is less than the lower outlier value), the process proceeds to step 620 in which the data point value is plotted into histogram with a first highlighting color. However, if the determination in step 618 is negative (i.e., the value of the data point is not less than the lower outlier value), the process proceeds to step 622.

A determination is then made in step 622 as to whether the value of the data point from step 616 is greater than the upper outlier value. If the determination in step 622 is affirmative (i.e., the value of the data point is greater than the upper outlier value), the process proceeds to step 624 in which the data point value is plotted into histogram with a second highlighting color. However, if the determination in step 622 is negative (i.e., the value of the data point is not greater than the upper outlier value), the process proceeds to step 626 in which the data point is plotted into histogram with a non-highlighting color. The non-highlighting color is different from the first and second highlighting colors. The first and second highlighting colors may be different colors, or may be the same color.

After the data point from step 616 is plotted as either a non-highlighting color or one of the highlighting colors (i.e., steps 620, 624, or 626), the process proceeds to step 628 in which a determination is made as to whether there is another data point from the set of data points to process. If the determination in step 628 is affirmative (i.e., there is another data point to process), then the process loops back to step 616 to process this next data point in the same manner as just described hereinabove. However, if the determination in step 628 is negative (i.e., there is not another data point to process), then the process proceeds to step 630 to display the histogram on a display to enable a user (such as the DBA) to view the histogram which has been generated in the manner just described hereinabove.

Figure 7:
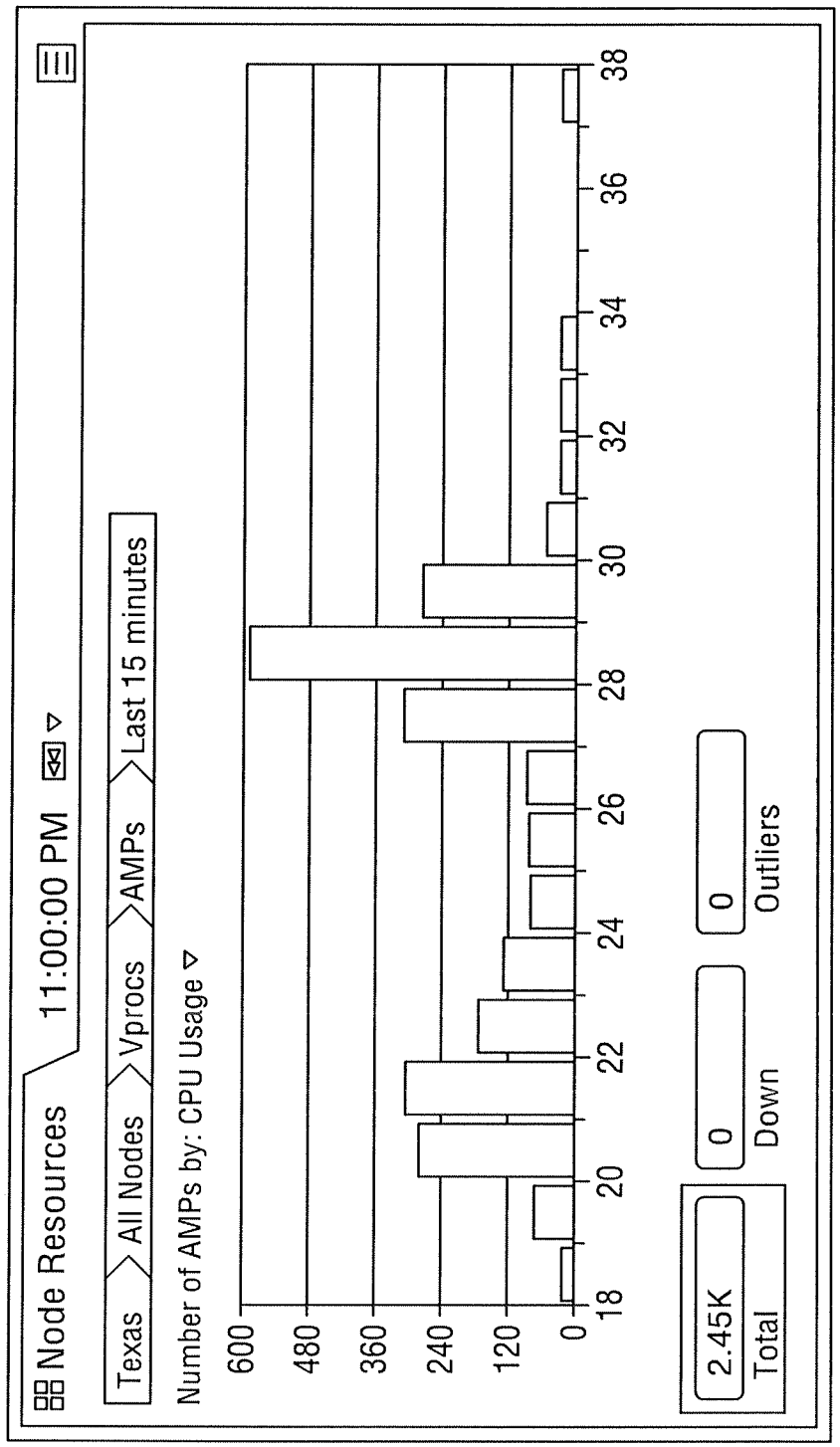
FIGS. 7, 8, and 9 are example histograms plotted in accordance with disclosed embodiments.

FIG. 7 is an example histogram 700 which has been plotted in accordance with the process of the flowchart 600 of FIG. 6. Histogram 700 does not quite have the look of a bell curve or normal distribution. Histogram 700 depicts CPU usage in which there are no outlier data points (i.e., none of the processing modules $110_{1...N}$ shown in FIG. 1 has a CPU usage which has been determined to be an outlier). Since none of the processing modules $110_{1...N}$ is determined to be an outlier, the color of each bar of histogram 700 is of a non-highlighting color which may be black or gray, for examples. This allows the user to quickly and easily see that there is no potential skew condition which needs attention at this time.

Figure 8:
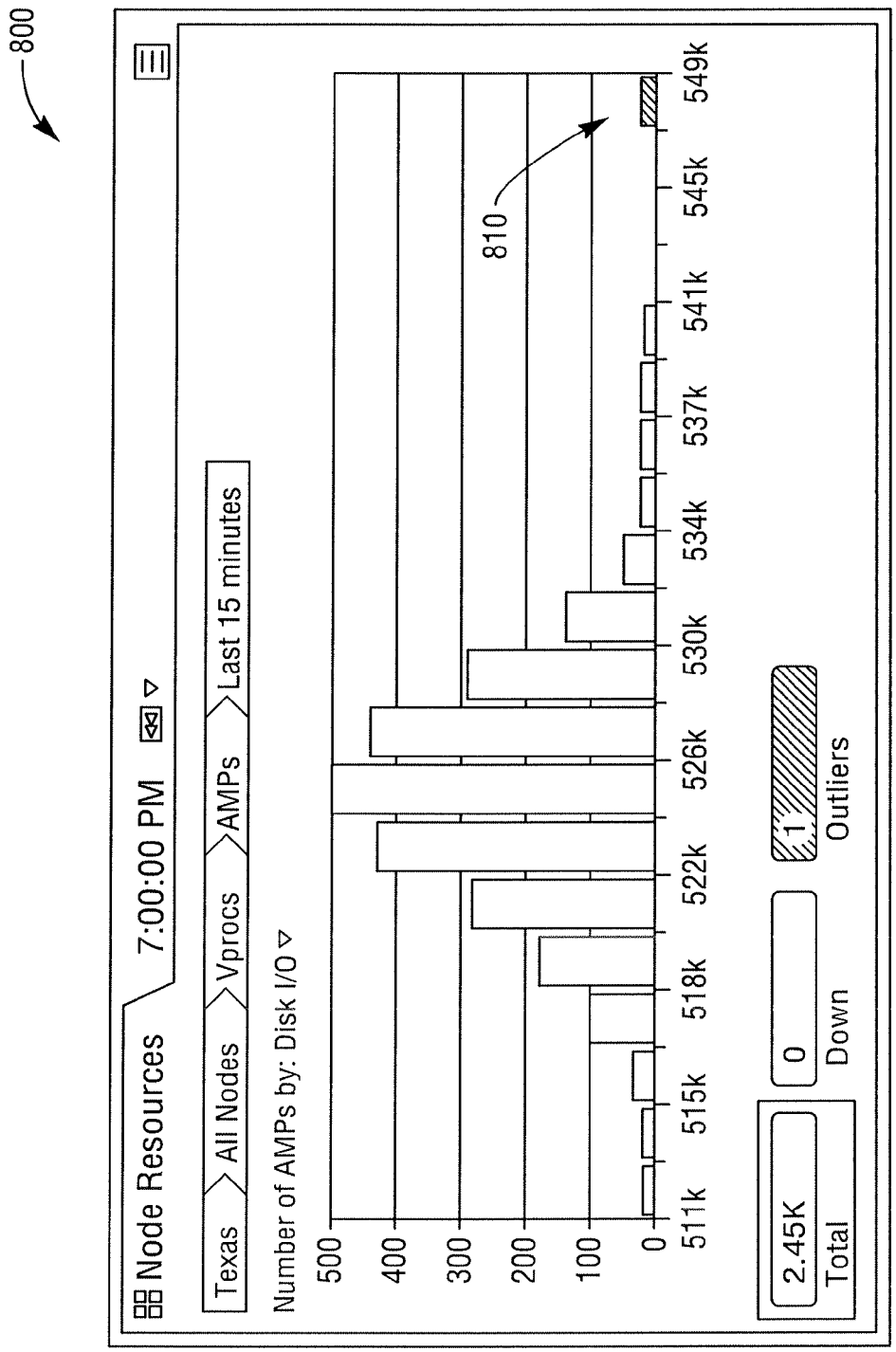

FIG. 8 is another example histogram 800 which has been plotted in accordance with the process of the flowchart 600 of FIG. 6. Histogram 800 has the look of a bell curve or normal distribution. Histogram 800 depicts disk I/O usage in which there is only outlier data point (i.e., there is only one processing module in the DBS 100 shown in FIG. 1 which has been determined to be an outlier). This outlier is identified in FIG. 8 with reference numeral "810". The color of the outlier bar of histogram 800 is of highlighting color which may be red of orange, for examples. The color of the non-outlier bars (i.e., the remaining histogram bars) is of a non-highlighting color which may be black or gray, for examples. This allows the user to quickly and easily see that there is a "hot" spot which needs to be investigated to address the skew condition. As an example, the user may "click" on the outlier bar of histogram 800 to drill down to identify the nodes or virtual processors that are skewed, and then to perform additional analysis to determine the cause of the skew and eliminate it going forward.

Figure 9:
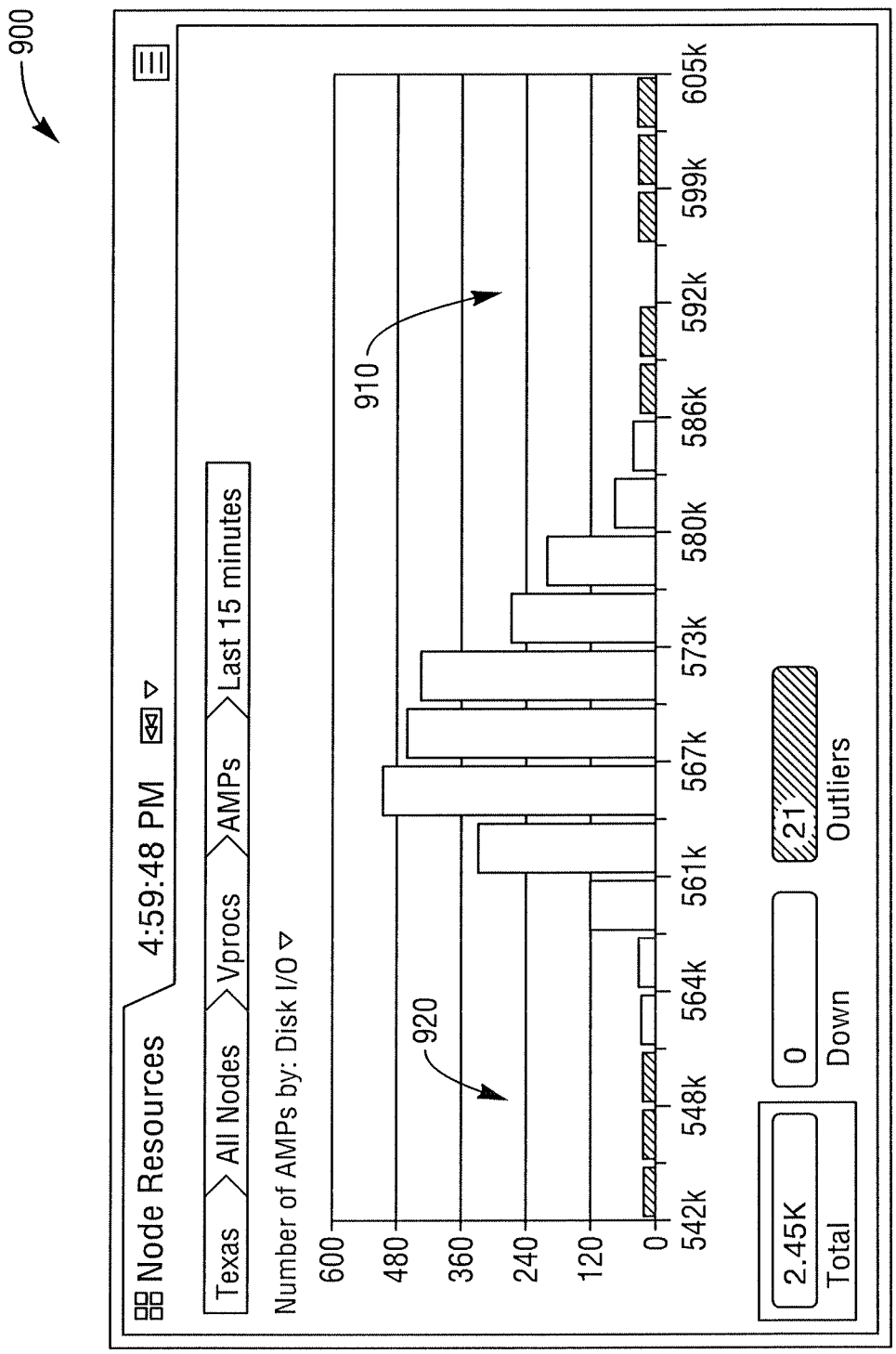

FIG. 9 is yet another example histogram 900 which has been plotted in accordance with the process of the flowchart 600 of FIG. 6. Histogram 900 has the look of a bell curve or normal distribution. Histogram 900 depicts disk I/O usage in which there are 21 outlier data points. These outliers are identified in FIG. 9 with reference numerals "910" and "920". Outliers 910 are shown to the right of the normal distribution curve, and outliers 920 are shown to the left of the normal distribution curve. The color of each of the outlier bars 910 of histogram 900 is of a first highlighting color which may be red or orange, for examples. Similarly, the color of each of the outlier bars 920 of histogram 900 is of a second highlighting color which may be different or the same as the first highlighting color. The color of the non-outlier bars (i.e., the remaining histogram bars) is of a non-highlighting color which may be black or gray, for examples. This allows the user to quickly and easily see that there is significant skewing of resources (which is disk I/O usage in this example) which needs to be investigated to address the skew condition.

It should be apparent that the above description describes a monitoring solution in which a user can quickly and easily identify an actual or potential skew condition by visualizing the potential skew condition. The skew visualization is implemented by using a different color to highlight outlier resource usage data points. For example, red or orange may be used to highlight outliers, whereas black or gray may be used as a non-highlighting color for non-outliers. The automatic calculation of outliers identifies each data point as a data point outside 1.5 times the IQR. The result is a simple visualization that is easy for the user to comprehend as a bar chart, instead of forcing the user to interpret data, the scale of the data, and the distribution of the data. The user can quickly and easily identify an actual or potential skew condition by simply visualizing the bar chart (i.e., the histogram in this case) without having to drill down into raw data associated with the bar chart. Accordingly, once the user has identified an actual or potential skew condition, the user can focus on determining the cause of the skew and finding ways to eliminate the skew from the system.

It should also be apparent that the above described monitoring facility may be implemented using any commercially-programming language. For example, calculation of the IQR values and calculation of the histogram distribution may be implemented by PostgreSQL functions written using the PL/PGSQL language.

Although the above description describes using three points (i.e., Q1, Q2, and Q3) to define four equal groups of data points and an interquartile range (i.e., the IQR), it is conceivable that a different number of points may be used to define a different number of equal groups and a different range. It is also conceivable that unequal groups of data points may be defined. Further, although the above description describes a T-value of "1.5" being used, it is conceivable that a different T-value be used.

It should be apparent that the above description describes an apparatus and method that facilitate performance enhancement of a database system which uses a SLG-driven workload management system. It is conceivable that the above-described apparatus and method may be applied to facilitate performance enhancement of any type of database system, including database systems which do not use a workload management system. The apparatus and method are applicable to a wide variety of actual or potential skew conditions involving CPU usage, disk I/O usage, memory usage, or network usage, for examples.

The above-described flowchart 600 of FIG. 6 depicts process serialization to facilitate an understanding of disclosed embodiments and is not necessarily indicative of the serialization of the operations being performed. In various embodiments, the processing steps described in the flowchart above may be performed in varying order, and one or more depicted steps may be performed in parallel with other steps. Additionally, execution of some processing steps of the flowchart above may be excluded without departing from embodiments disclosed herein.

The illustrative block diagrams and flowchart(s) depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer.

The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information.

Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

The text above described one or more specific embodiments of a broader invention. The invention also is carried out in a variety of alternative embodiments and thus is not limited to those described here. For example, while the invention has been described here in terms of a DBS that uses a massively parallel processing (MPP) architecture, other types of database systems, including those that use a symmetric multiprocessing (SMP) architecture, are also useful in carrying out the invention. Many other embodiments are also within the scope of the following claims.

What is claimed is:

1. An apparatus for facilitating performance monitoring of a large database system, the apparatus comprising:
   a processor; and
   a storage device communicatively coupled with the processor, wherein the processor is programmed to
   (i) retrieve a set of resource usage data points,
   (ii) calculate a first outlier threshold value based upon values of data points from the set of resource usage data points,
   (iii) determine if the value of each data point of the retrieved set of resource usage data points is outside of the calculated first outlier threshold value,
   (iv) plot the value of the data point in histogram with a first color when the data point value is determined to be outside of the calculated first outlier threshold value,
   (v) plot the value of the data point in histogram with a second color which is different from the first color when the data point value is determined to be not outside of the calculated first outlier threshold value,
   (vi) display the histogram containing plotted data point values of the first color and plotted data point values of the second color which is different from the first color to enable a user to quickly and easily identify a potential skew condition associated with the large database system,
   (vii) calculate a second outlier threshold value based upon values of data points from the set of resource usage data points,
   (viii) determine if the value of each data point of the retrieved set of resource usage data points is outside of the calculated second outlier threshold value when a determination has been made that the value of the data point is not outside of the calculated first outlier threshold value,
   (ix) plot the value of the data point in histogram with a third color when the data point value is determined to be outside of the calculated second outlier threshold value,
   (x) plot the value of the data point in histogram with the second color when the data point value is determined to be not outside of the calculated second outlier threshold value, and
   (xi) display the histogram containing plotted data point values of the first color, plotted data point values of the second color, and plotted data point values of the third color to enable a user to quickly and easily identify a potential skew condition associated with the large database system, and
   wherein the difference between the first and second outlier threshold values define an interquartile range (IQR).

2. An apparatus according to claim 1, wherein the first and third colors comprise the same color.

3. A method of processing a set of resource usage data points associated with a large database system to enable a user to evaluate a potential skew condition associated with the large database system, the method comprising:
   retrieving the set of resource usage data points;
   electronically by a processor, calculating a first outlier threshold value based upon values of data points from the set of resource usage data points;
   electronically by a processor, determining if the value of each data point of the retrieved set of resource usage data points is outside of the calculated first outlier threshold value;
   plotting the value of the data point in histogram with a first color when the data point value is determined to be outside of the calculated first outlier threshold value;
   plotting the value of the data point in histogram with a second color which is different from the first color when the data point value is determined to be not outside of the calculated first outlier threshold value;
   displaying the histogram containing plotted data point values of the first color and plotted data point values of the second color which is different from the first color to enable a user to quickly and easily identify a potential skew condition associated with the large database system, electronically by a processor, calculating a second outlier threshold value based upon values of data points from the set of resource usage data points;

electronically by a processor, determining if the value of each data point of the retrieved set of resource usage data points is outside of the calculated second outlier threshold value when a determination has been made that the value of the data point is not outside of the calculated first outlier threshold value;

plotting the value of the data point in histogram with a third color when the data point value is determined to be outside of the calculated second outlier threshold value;

plotting the value of the data point in histogram with the second color when the data point value is determined to be not outside of the calculated second outlier threshold value;

displaying the histogram containing plotted data point values of the first color, plotted data point values of the second color, and plotted data point values of the third color to enable a user to quickly and easily identify a potential skew condition associated with the database system, and wherein the difference between the first and second outlier threshold values define an interquartile range (IQR).

4. A method according to claim 3, wherein the first and third colors comprise the same color.

5. A method according to claim 3 wherein the method is performed by a computer having a memory executing one or more programs of instructions which are tangibly embodied in a program storage medium readable by the computer.

* * * * *